US006183039B1

(12) United States Patent
Kohut et al.

(10) Patent No.: US 6,183,039 B1
(45) Date of Patent: Feb. 6, 2001

(54) PIVOT AND SLIDE DOOR SYSTEM

(75) Inventors: George Rodney Kohut, Troy; Ronald James Wilde, St. Clair Shores; Lloyd Walker Rogers, Jr., Shelby Township, all of MI (US)

(73) Assignee: Delphi Technologies, Inc., Troy, MI (US)

( * ) Notice: Under 35 U.S.C. 154(b), the term of this patent shall be extended for 0 days.

(21) Appl. No.: 09/245,225

(22) Filed: Feb. 5, 1999

(51) Int. Cl.[7] ........ B60J 5/06
(52) U.S. Cl. ........ 296/155; 296/146.12; 42/221; 42/223
(58) Field of Search ........ 296/155, 146.11, 296/146.12; 49/254, 209, 218, 219, 221, 223, 225

(56) References Cited

U.S. PATENT DOCUMENTS

| | | | | |
|---|---|---|---|---|
| 4,019,775 | * | 4/1977 | Grossbach et al. | 296/155 |
| 4,025,104 | * | 5/1977 | Grossbach et al. | 296/155 |
| 4,110,934 | * | 9/1978 | Zens | 49/218 |
| 4,135,760 | * | 1/1979 | Grossbach | 296/155 |
| 4,945,677 | * | 8/1990 | Kramer | 49/210 |
| 4,981,321 | * | 1/1991 | Watanabe et al. | 296/155 |
| 5,896,704 | * | 4/1999 | Neag et al. | 49/209 |
| 5,921,613 | * | 7/1999 | Breunig et al. | 296/155 |
| 5,967,595 | * | 10/1999 | Heya et al. | 296/155 |

* cited by examiner

*Primary Examiner*—Joseph D. Pape
(74) *Attorney, Agent, or Firm*—Patrick M. Griffin

(57) ABSTRACT

A pivot and slide door system for an automotive vehicle includes a door adapted to be disposed in a door opening of a vehicle body. The pivot and slide door system also includes a pivot assembly attached to the vehicle body and cooperating with the door to pivot the door from a closed position to a pivot position. The pivot and slide door system further includes a slide assembly cooperating with the pivot assembly to slide the door from the pivot position to an open position.

22 Claims, 4 Drawing Sheets

PIVOT AND SLIDE DOOR SYSTEM

BACKGROUND OF THE INVENTION

1. Field of the Invention

The present invention relates generally to door systems for vehicles and, more particularly, to a pivot and slide door system for an automotive vehicle.

2. Description of the Related Art

It is known to provide a door system for a vehicle such as an automotive vehicle to allow an occupant to enter and exit an occupant compartment through a door opening in a vehicle body of the automotive vehicle. The door system typically includes a door extending longitudinally to close the door opening. The door is pivotally mounted at a front end by a hinge to vehicle structure forming the door opening on the vehicle body. The door system also includes a latch at a rear end of the door to latch the door in a close position to a striker connected to the vehicle structure. In operation, an operator moves a handle to unlatch the door from the striker and pivot the door via the hinge to open the door opening. To close the door, the operator pivots the door via the hinge to close the door opening and engage the latch with the striker.

Although the above door system has worked well, it is desirable to open and close the door opening via the door when the automotive vehicle is parked close to an object. It is also desirable to improve the ingress/egress through the door opening to the occupant compartment via the door. It is further desirable to improve the ease of operation of the door independent of the size of the door. Therefore, there is a need in the art to provide an improved door system for an automotive vehicle.

SUMMARY OF THE INVENTION

It is, therefore, one object of the present invention to provide a pivot and slide door system for an automotive vehicle.

It is another object of the present invention to provide a pivot and slide door system for a vehicle, which uses the same door opening and seals as current hinge mounted doors.

To achieve the foregoing objects, the present invention is a pivot and slide door system for an automotive vehicle. The pivot and slide door system includes a door adapted to be disposed in a door opening of a vehicle body and a pivot assembly attached to the vehicle body and cooperating with the door to pivot the door from a closed position to a pivot position. The pivot and slide door system also includes a slide assembly cooperating with the pivot assembly to slide the door from the pivot position to an open position to allow ingress/egress through the door opening.

One advantage of the present invention is that a pivot and slide door system is provided for an automotive vehicle. Another advantage of the present invention is that the pivot and slide door system allows door operation in a narrow parking space or when the automotive vehicle is parked closely to an object. Yet another advantage of the present invention is that the pivot and slide door system provides improved ingress/egress through the door opening to the occupant compartment of the automotive vehicle. Still another advantage of the present invention is that the pivot and slide door system improves ease of operation of the door and is not dependent on door size. A further advantage of the present invention is that the pivot and slide door system can have a manual or powered operation. Yet a further advantage of the present invention is that the pivot and slide door system can be used with the same door opening and seal as current hinge mounted doors.

Other objects, features and advantages of the present invention will be readily appreciated, as the same becomes better understood after reading the subsequent description taken in conjunction with the accompanying drawings.

DETAILED DESCRIPTION OF THE PREFERRED EMBODIMENT

Figure 1:
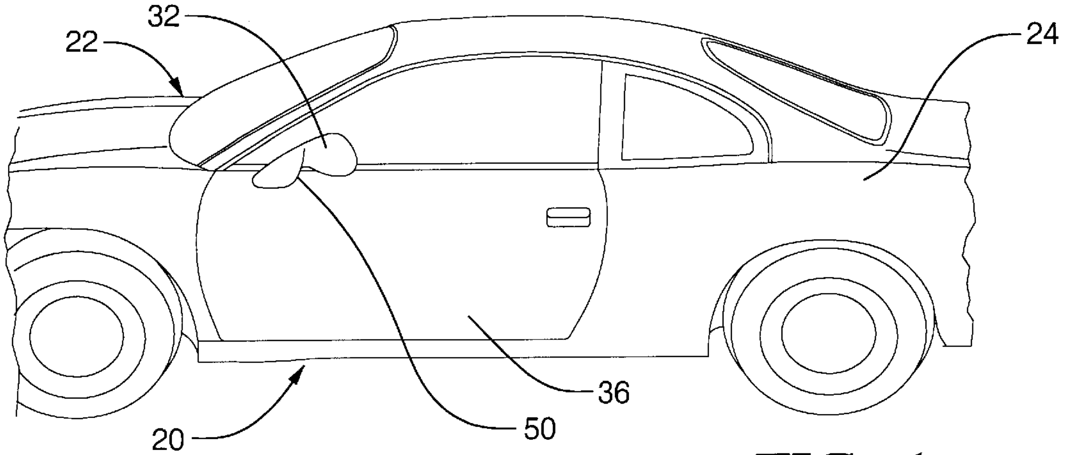
FIG. 1 is a perspective view of a pivot and slide door system, according to the present invention, illustrated in operational relationship with an automotive vehicle.
Figure 2:
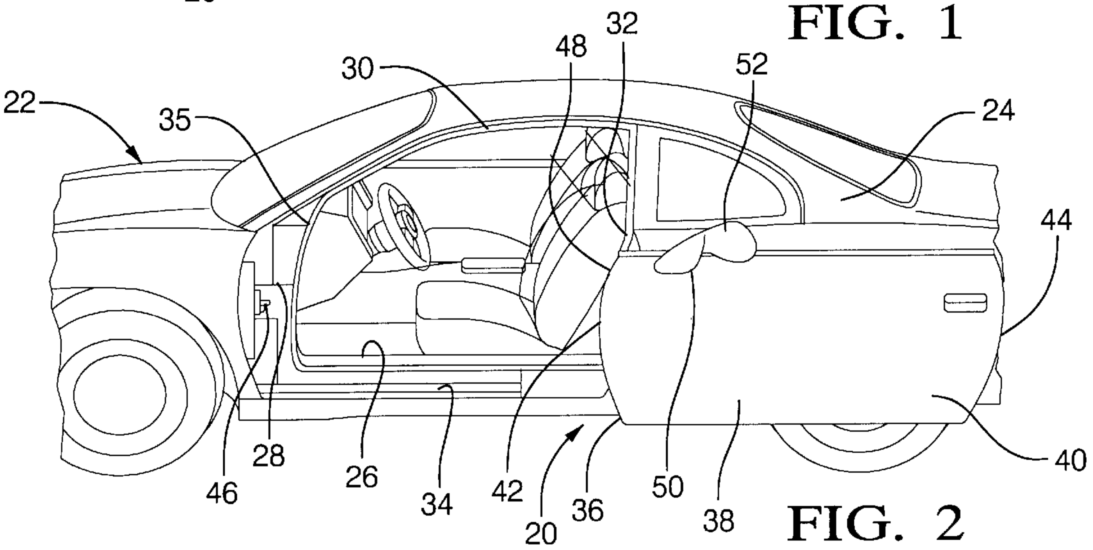
FIG. 2 is a view similar to FIG. 1 illustrating a door of the pivot and slide door system in an open position.

Referring to the drawings and in particular FIGS. 1 and 2, one embodiment of a pivot and slide door system 20, according to the present invention, is shown for a vehicle such as an automotive vehicle, generally indicated at 22. It should be appreciated that, in this example, the pivot and slide door system 20 is shown for a two-door vehicle application. It should also be appreciated that the pivot and slide door system 20 may be used for four-door vehicle applications.

Referring to FIGS. 1 and 2, the automotive vehicle 22 includes a vehicle body 24 having a least one door opening 26. The vehicle body 24 has a front pillar 28, roof rail 30, rear pillar 32 and rocker arm 34 forming the door opening 26. The vehicle body 24 also has a seal 35 disposed about the door opening 26. It should be appreciated that the vehicle body 24 is conventional and known in the art.

Referring to FIGS. 1 through 5, the pivot and slide door system 20 includes a door 36 for closing the door opening 26. The door 36 includes an outer panel 38 and an inner panel 40 joined together by suitable means such as welding. The door 36 includes a front latch 42 and a rear latch 44 for latching the door 36 in a closed position disposed within the door opening 26. The front latch 42 cooperates with a striker 46 attached to the front pillar 28 and the rear latch 44 cooperates with a striker 48 attached to attached to the rear pillar 32. In this embodiment, the latches 42 and 44 are actuated by a motor (not shown) disposed within the door 36. The motor is connected to a source of power (not shown) such as a battery when the door 36 is in the closed position. The motor is activated by a switch 50 disposed on a side mirror assembly 54. It should be appreciated that the door 36 may include a handle 56 to allow an operator to grasp and move the door 36.

Figure 3:
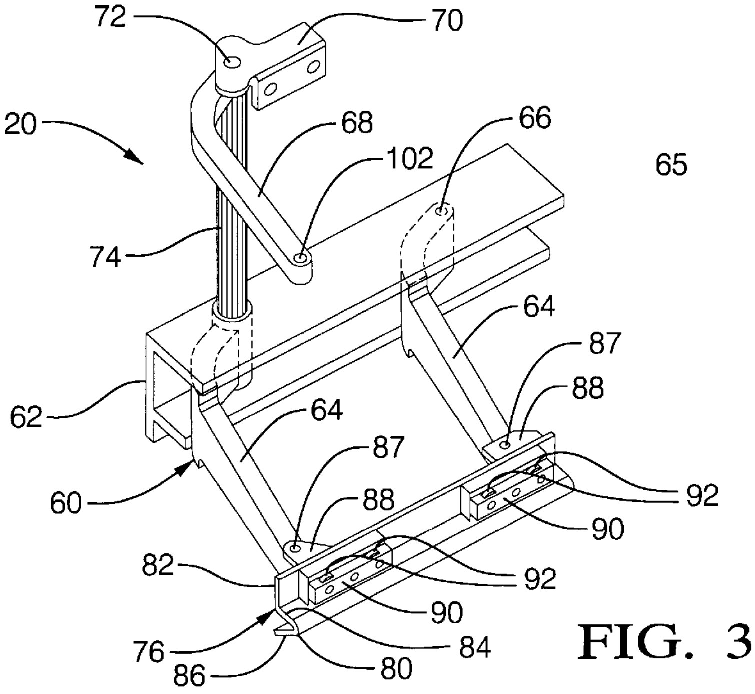
FIG. 3 is a perspective view of a pivot assembly of the pivot and slide door system of FIG. 1.
Figure 5:
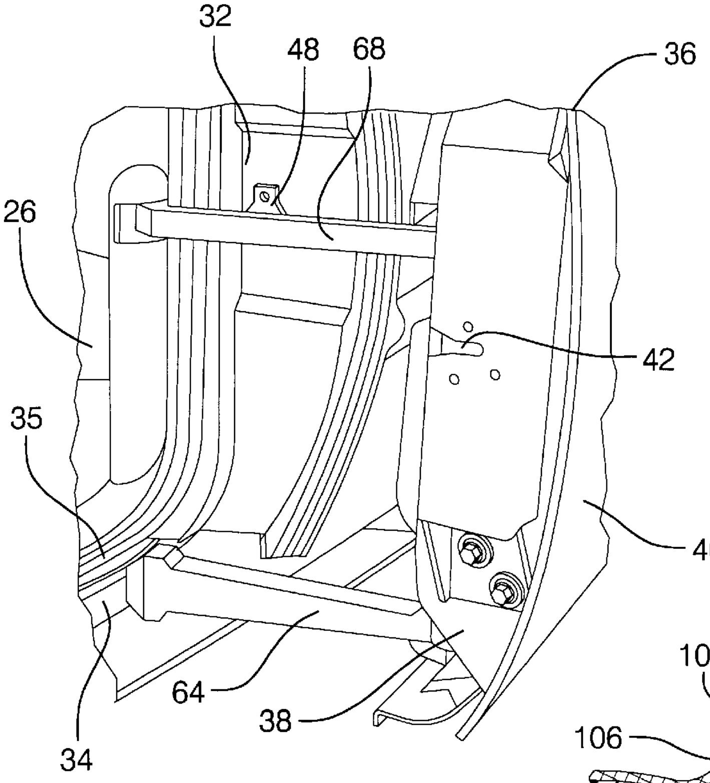
FIG. 5 is a perspective end view of the pivot and slide door system of FIG. 1 illustrating the door in the open position.

Referring to FIGS. 3 and 5, the pivot and slide door system 20 also includes a pivot assembly, generally indicated at 60, to pivot the door 36 outward from a closed position disposed within the door opening 26 to a pivot position spaced from the vehicle body 24. The pivot assembly 60 includes a rocker support member 62 attached to the vehicle body 24. The support member 62 has a generally U-shaped cross-section and is attached to the rocker arm 34 of the vehicle body 24 by suitable means such as welding.

The pivot assembly 60 includes at least one, preferably a pair of lower arms 64 pivotally attached to the support member 62. The lower arms 64 extend laterally and are spaced longitudinally. The lower arms 64 have one end disposed within a channel 65 of the support member 62 and are attached to the support member 62 by suitable means such as a pin 66. The pivot assembly 60 includes at least one upper arm 68. The upper arm 68 is aligned with the front lower arm 64. The upper arm 68 extends laterally and is pivotally connected to a support strap 70 by suitable means such as a pin 72. The support strap 70 is connected to the rear pillar 32 by suitable means such as fasteners (not shown). It should be appreciated that bushings or bearings (not shown) are disposed between the pins 66 and 72 and the lower arms 64 and upper arm 68, respectively. It should also be appreciated that the lower arms 64 support the door 36 and the upper arm 68 stabilizes the door 36

The pivot assembly 60 includes a torque tube 74 interconnecting the upper arm 68 and the front lower arm 64. The torque tube 74 is connected to the front lower arm 64 and upper arm 68 by suitable means such as a spline fit. The torque tube 74 is disposed inboard of the seal 35. The torque tube 74 synchronizes pivot motion between the front lower arm 64 and the upper arm 68 and allows the front lower arm 64 and the upper arm 68 to move simultaneously as a unit. It should be appreciated that the lower pivot assembly 60 may include an arm detent (not shown) to stop rearward rotation of the lower pivot assembly 60.

Figure 4:
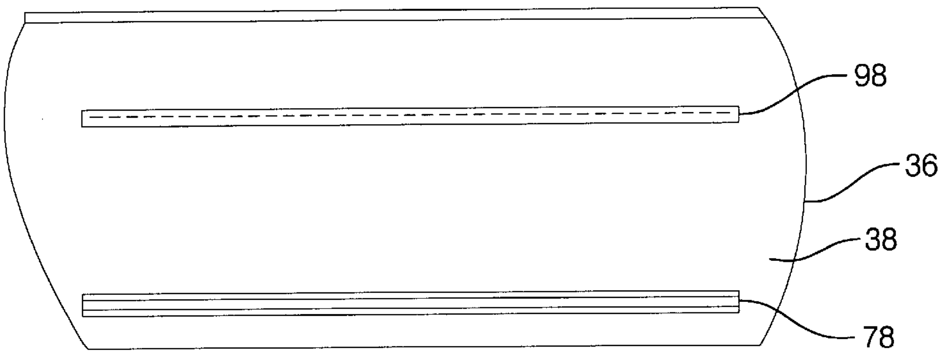
FIG. 4 is an elevational interior view of a door of the pivot and slide door system of FIG. 1.
Figure 7:
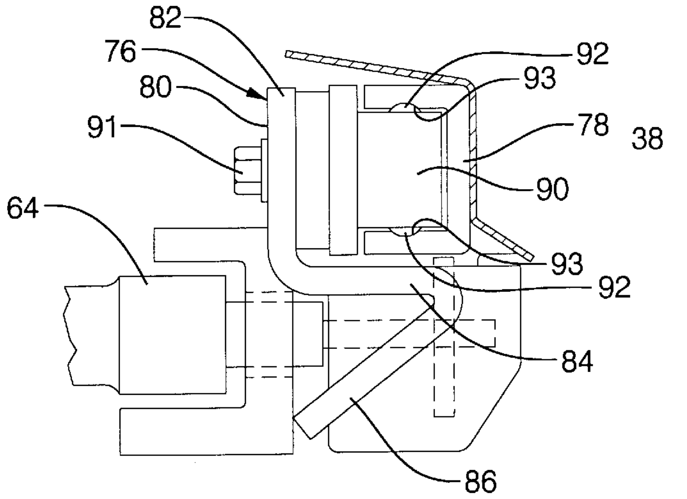
FIG. 7 is a fragmentary view of a lower slide assembly of the pivot and slide door system of FIG. 1.

Referring to FIGS. 3, 4 and 7, the pivot and slide door system 10 includes a lower slide assembly, generally indicated at 76, connected to the lower arms 64 to allow the door 36 to slide rearward to allow ingress/egress via the door opening 26. The lower slide assembly 76 includes a lower track 78 extending longitudinally along a lower portion of the door 36. The lower track 78 has a generally C-shaped cross-section and is secured to the inner panel 38 of the door 36 by suitable means such as welding.

The lower slide assembly 76 includes a carrier or support plate 80 extending longitudinally and connected to the ends of the lower arms 64. The support plate 80 has a generally vertical portion 82, a generally horizontal portion 84 at a lower end of the vertical portion 82 and an inclined portion 86 extending at an angle away from the door 36 at one end of the horizontal portion 84. The ends of the lower arms 64 are spaced longitudinally and pivotally connected by suitable means such as pins 87 to brackets 88 on the support plate 80. It should be appreciated that the bushings or bearings (not shown) may be disposed between the pins 87 and lower arms 64. It should also be appreciated that the support plate 80 synchronizes the lower arms 64 and supports the fore/aft slide member 90 to be described.

The lower slide assembly 76 includes at least one, preferably a pair of bearing blocks or slide members 90. The slide members 90 are spaced longitudinally and secured to the vertical portion 82 of the support plate 80 by suitable means such as fasteners 91. Each slide member 90 has at least one, preferably a plurality of upper and lower rollers 92 that travel along upper and lower channels 93 of the lower track 78. It should be appreciated that the rollers 92 are adjustable relative to the channels 93. It should also be appreciated that the slide members 90 are conventional and known in the art.

Figure 6:
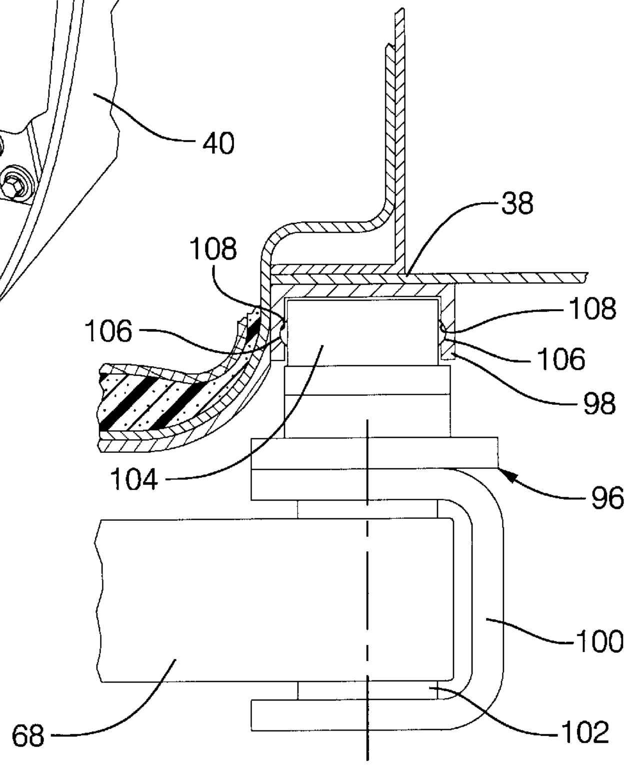
FIG. 6 is a fragmentary view of an upper slide assembly of the pivot and slide door system of FIG. 1.

Referring to FIGS. 3, 4 and 6, the pivot and slide door system 20 includes an upper slide assembly, generally indicated at 96, connected to the upper arm 68. The upper slide assembly 96 includes an upper track 98 extending longitudinally along an upper portion of the door 36. Preferably, the upper track 98 is located beneath an armrest (not shown) of the door 36. The upper track 98 has a generally C-shaped cross section and is secured to the inner panel 38 of the door 36 by suitable means such as welding. It should be appreciated that the upper track 98 is orientated approximately ninety degrees from the lower track 78.

The upper slide assembly 96 includes a support plate 100 connected to the end of the upper arm 68. The support plate 100 has a generally C-shape and extends longitudinally. The end of the upper arm 68 is pivotally connected by suitable means such as a pin 102 to the support plate 100. It should be appreciated that a bushing or bearing (not shown) may be disposed between the pin 102 and upper arm 68.

The upper slide assembly 96 includes a slide member 104. The slide member 104 is secured to the support plate 100 by suitable means such as fasteners (not shown). The slide member 104 has at least one, preferably a plurality of upper and lower rollers 106 that travel along upper and lower channels 108 of the lower track 98. It should be appreciated that the rollers 106 are adjustable relative to the channels 108. It should also be appreciated that the slide member 104 is conventional and known in the art.

Figure 8:
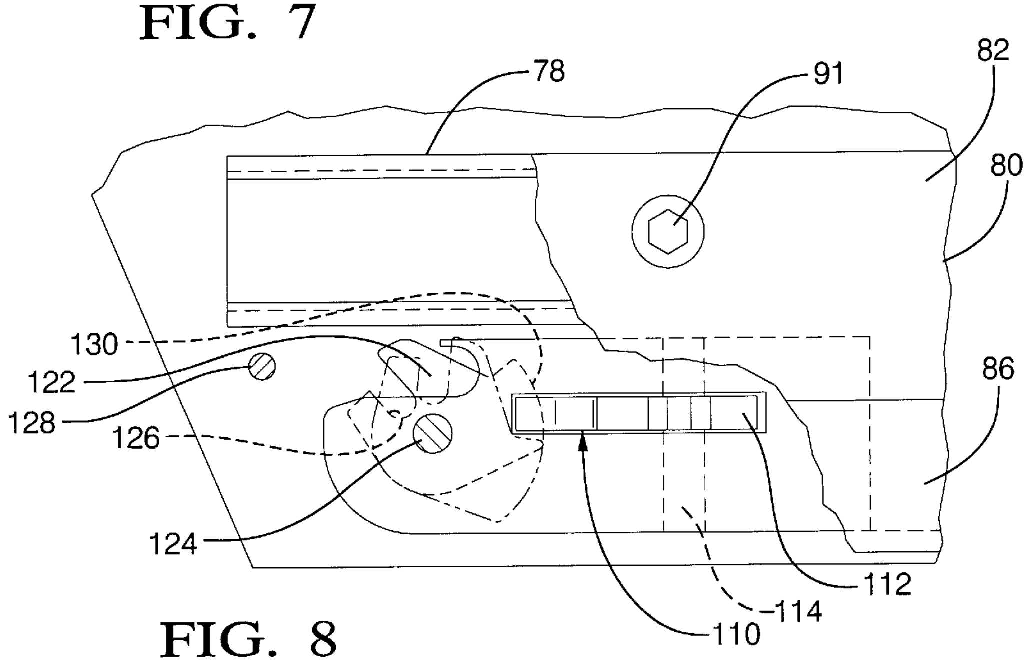
FIG. 8 is an elevational view of an interlock assembly of the pivot and slide door system of FIG. 1.
Figure 9:
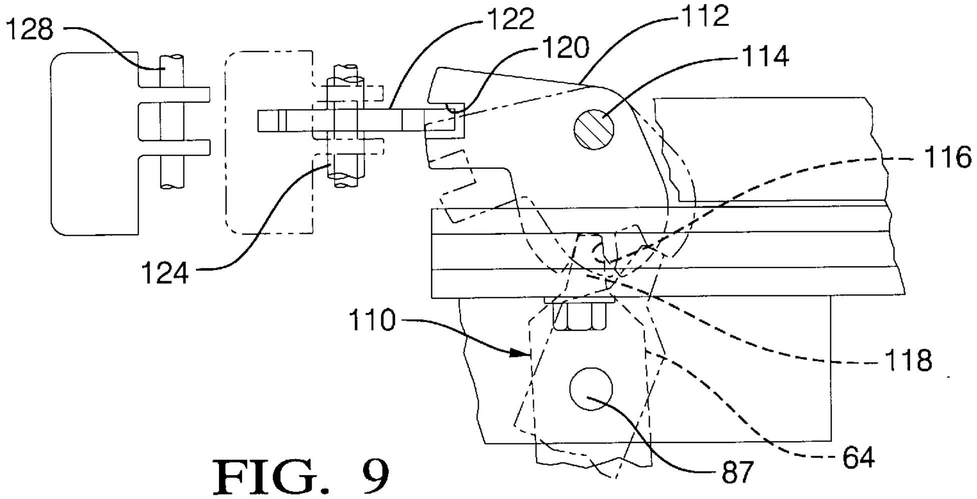
FIG. 9 is a plan view of the interlock assembly of the pivot and slide door system of FIG. 1.

Referring to FIGS. 8 and 9, the pivot and slide door system 20 includes an interlock assembly, generally indicated at 110, to lock and release the lower slide assembly 76 to the lower pivot assembly 60 to prevent and allow the door 36 to slide fore/aft, respectively. The interlock assembly 110 prevents the door 36 from moving in a fore/aft direction before the lower pivot assembly 76 has moved to its full (open) rotational position. The interlock assembly 110 prevents the lower arms 64 from pivoting when the door 36 is not in the full forward sliding position. It should be appreciated that the interlock assembly 110 prevents the door 36 from contacting the vehicle body 24 during a rotational movement or a sliding movement.

The interlock assembly 110 includes a first cam 112 pivotally connected by suitable means such as a pin 114 and bracket to the support plate 80. The first cam 112 has a first recess 116 for receiving a projection 118 on the rear lower arm 64. The first cam 112 has a second recess 120 spaced circumferentially from the first recess 116 for receiving a second cam 122 to be described. A spring (not shown) is connected to the first cam 112 to urge the first cam 112 away from the rear lower arm 64. It should be appreciated that the first cam 112 rotates about the pin 114. It should also be appreciated that the rear lower arm 64 is locked to the support plate 80 when the projection 118 is disposed in the first recess 116.

The interlock assembly 110 includes a second cam 122 cooperating with the door 36 and the first cam 108. The second cam 122 is pivotally mounted by suitable means such as a pin 124 and bracket to the support plate 80. The second cam 122 has a recess 126 for receiving a lock pin or pawl 128 attached to the inner panel 38 of the door 36 beneath the lower track 78. The second cam 122 also has a projection 130 to be disposed in the second recess 120 of the first cam 112. A spring (not shown) is connected to the second cam 122 to urge the second cam 122 downwardly away from the projection 128. It should be appreciated that the second cam 122 rotates about the pin 124. It should also be appreciated that the door 36 is locked to the lower slide assembly 76 when the lock pin 128 is disposed in the recess 126 of the second cam 122.

Figure 10:
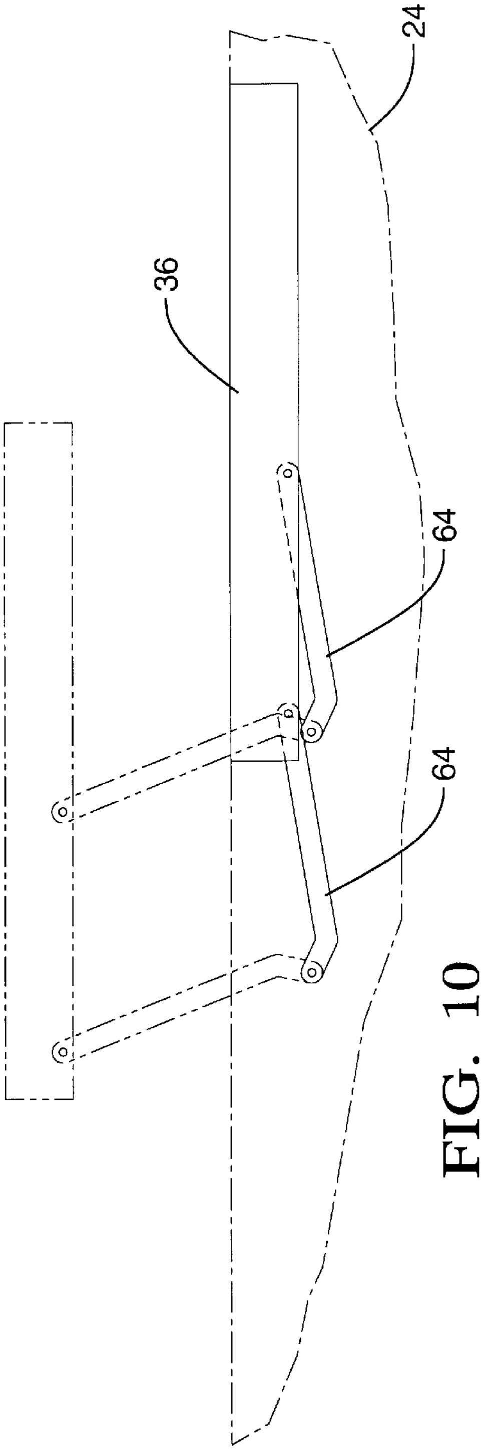
FIG. 10 is a diagramatic plan view of the pivot and slide door system of FIG. 1 illustrating operation between a closed position and a pivot position.
Figure 11:
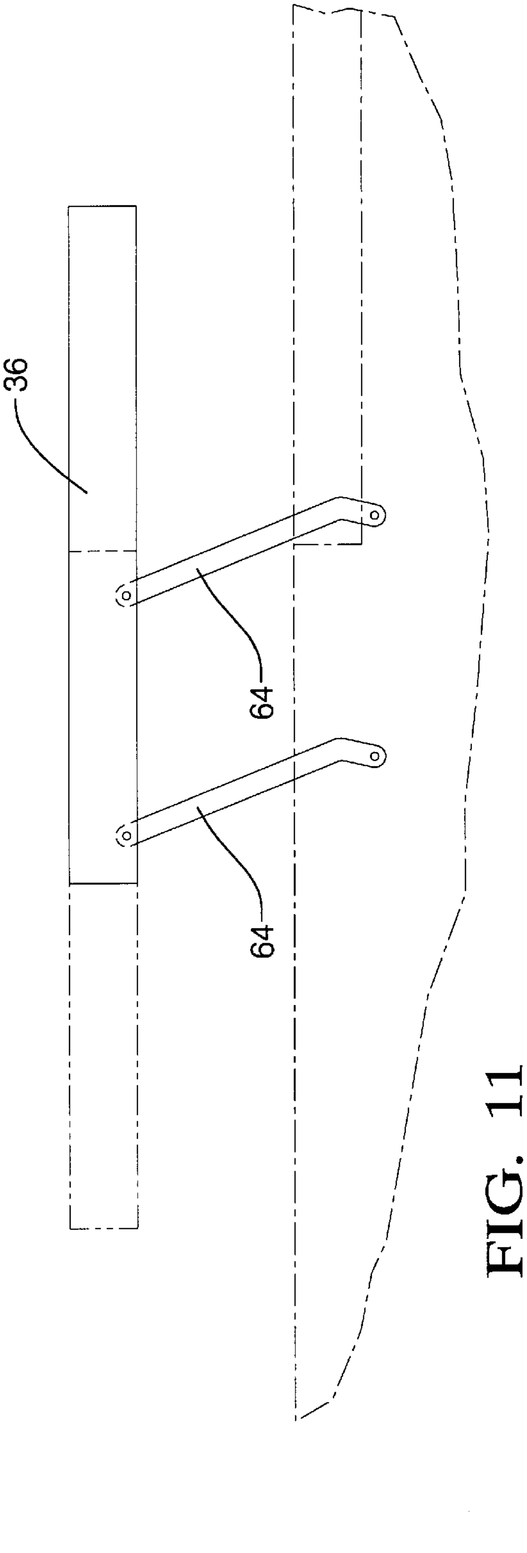
FIG. 11 is a view similar to FIG. 10 illustrating operation of the pivot and slide door system between a pivot position and an open position.

In operation of the pivot and slide door system 20, the door 36 is disposed in the door opening 36 in a closed position as illustrated in FIG. 1. An operator (not shown) manually moves the switch 50 to activate the motor to release the front and rear latches 42 and 44 from the front and rear strikers 46 and 48 and the door 36 is free to swing in an outward direction. The operator manually pulls outwardly on the door 36, preferably in the center thereof, to pivot the door 36 outward to a pivot position as illustrated in FIG. 10. The pivot arms 64 and 68 rotate to extend the door 36 laterally a predetermined amount such as sixteen inches such that the door 36 is spaced laterally from the vehicle body 24. The projection 118 enters the first recess 116 to rotate the first cam 112 to lock the pivot arms 64 to the support plate 80. Rotation of the first cam 112 aligns the second recess 120 with the second cam 122 to allow the second cam 122 to rotate. The operator manually slides the door 36 rearward to rotate the second cam 122 and move the lock pin 128 out of the recess 126. The door 36 slides rearward as illustrated in FIG. 11 to an open position to allow ingress/egress through the door opening 26 as illustrated in FIG. 2.

To close the door 36, the operator manually slides the door 36 forward until the lock pin 128 on the door 36 engages the recess 126 on the second cam 122 and rotates the second cam 122 to release the first cam 112. When the operator pivots the door 36, the projection 118 on the rear lower arm 64 rotates to disengage the first recess 116 and the first cam 112 rotates to unlock the rear lower arm 64 of the lower pivot assembly 60. The operator manually pushes the door 36 via the arms 64 and 68 to rotate the door 36 inward to the closed position of FIG. 1. It should be appreciated that the latches 42 and 44 engage the strikers 46 and 48 to secure the door 36 in the closed position. It should also be appreciated that the door 36 could be powered instead of manually moved.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A pivot and slide door system for an automotive vehicle comprising:

a door adapted to be disposed in a door opening of a vehicle body;

a pivot assembly attached to the vehicle body and cooperating with said door to pivot said door from a closed position to a pivot position;

a slide assembly cooperating with said pivot assembly to slide said door from said pivot position to an open position; and an interlock assembly to releasably lock said slide assembly to said pivot assembly comprising a first cam pivotally attached to said slide assembly and cooperating with said pivot assembly and a second cam pivotally attached to said slide assembly and cooperating with said door and said first cam.

2. A pivot and slide door system as set forth in claim 1 wherein said pivot assembly includes at least one lower arm pivotally attached to the vehicle body and at least one upper arm pivotally attached to the vehicle body.

3. A pivot and slide door system as set forth in claim 2 wherein said pivot assembly includes a torque tube interconnecting said at least one lower arm and said at least one upper arm.

4. A pivot and slide door system as set forth in claim 1 wherein said slide assembly includes at least one track extending longitudinally along said door.

5. A pivot and slide door system as set forth in claim 4 wherein said slide assembly includes a slide member connected to said pivot assembly to allow sliding movement between said track and said slide member.

6. A pivot and slide door system as set forth in claim 1 wherein said first cam has a first recess for receiving a portion of said pivot assembly and a second recess for receiving a portion of said second cam.

7. A pivot and slide door system as set forth in claim 6 wherein said second cam has a third recess for receiving a portion of said door.

8. A door system as set forth in claim 1 including a front latch and a rear latch for latching said door to the vehicle body when said door is in the closed position.

9. A pivot and slide door system for an automotive vehicle comprising:

a door adapted to be disposed in a door opening of a vehicle body;

an upper pivot assembly and a lower pivot assembly attached to the vehicle body and cooperating with said door to pivot said door from a closed position to a pivot position;

an upper slide assembly cooperating with said upper pivot assembly and a lower slide assembly cooperating with said lower pivot assembly to slide said door from said pivot position to an open position; and an interlock assembly comprising at least one cam to releasably lock said lower slide assembly to said lower pivot assembly.

10. A pivot and slide door system as set forth in claim 9 wherein said lower pivot assembly includes a pair of lower arms pivotally attached to vehicle structure of the vehicle body.

11. A pivot and slide door system as set forth in claim 10 wherein said upper pivot assembly includes an upper arm pivotally attached to vehicle structure of the vehicle body.

12. A pivot and slide door system as set forth in claim 11 including a torque tube interconnecting one of said lower arms and said upper arm.

13. A pivot and slide door system as set forth in claim 9 wherein said upper slide assembly includes an upper track extending longitudinally along said door.

14. A pivot and slide door system as set forth in claim 13 wherein said upper slide assembly includes an upper slide member connected to said upper pivot assembly to allow sliding movement between said upper track and said upper slide member.

15. A pivot and slide door system as set forth in claim 9 wherein said lower slide assembly includes a lower track extending longitudinally along said door.

16. A pivot and slide door system as set forth in claim 15 wherein said lower slide assembly includes a pair of lower slide members connected to said lower pivot assembly to allow sliding movement between said lower track and said lower slide members.

17. A pivot and slide door system as set forth in claim 9 wherein said interlock assembly comprises a first cam pivotally attached to said lower slide assembly and cooperating with said lower pivot assembly and a second cam pivotally attached to said lower slide assembly and cooperating with said door and said first cam.

18. A pivot and slide door system for an automotive vehicle comprising:

a door extending longitudinally and having a front end and a rear end, said door being adapted to be disposed in a door opening of a vehicle body in a closed position;

an upper pivot assembly and a lower pivot assembly attached to vehicle structure of the vehicle body and cooperating with said door to pivot said front end and said rear end of said door from the closed position to a pivot position spaced from the vehicle body;

an upper slide assembly cooperating with said upper pivot assembly and a lower slide assembly cooperating with said lower pivot assembly to slide said door from said pivot position to an open position; and an interlock assembly comprising at least one cam to releasably lock said lower slide assembly to said lower pivot assembly.

19. A pivot and slide door system as set forth in claim 18 wherein said lower pivot assembly includes a pair of lower arms pivotally attached to vehicle structure, said upper pivot assembly includes an upper arm pivotally attached to vehicle structure, and including a torque tube interconnecting one of said lower arms and said upper arm.

20. A pivot and slide door system as set forth in claim 19 wherein said upper slide assembly includes an upper track extending longitudinally along said door and a slide member connected to said upper pivot assembly to allow sliding movement between said track and said slide member.

21. A pivot and slide door system as set forth in claim 20 wherein said lower slide assembly includes a lower track extending longitudinally along said door and a pair of slide members connected to said lower pivot assembly to allow sliding movement between said track and said slide members.

22. A pivot and slide door system for an automotive vehicle comprising:

a door extending longitudinally and having a front end and a rear end, said door being adapted to be disposed in a door opening of a vehicle body in a closed position;

an upper pivot assembly and a lower pivot assembly attached to vehicle structure of the vehicle body and cooperating with said door to pivot said front end and said rear end of said door from the closed position to a pivot position spaced from the vehicle body;

an upper slide assembly cooperating with said upper pivot assembly and a lower slide assembly cooperating with said lower pivot assembly to slide said door from said pivot position to an open position;

said lower pivot assembly including a pair of lower arms pivotally attached to vehicle structure, said upper pivot assembly including an upper arm pivotally attached to vehicle structure, and including a torque tube interconnecting one of said lower arms and said upper arm;

said upper slide assembly including an upper track extending longitudinally along said door and a slide member connected to said upper pivot assembly to allow sliding movement between said track and said slide member;

said lower slide assembly including a lower track extending longitudinally along said door and a pair of slide members connected to said lower pivot assembly to allow sliding movement between said track and said slide members; and an interlock assembly to releasably lock said lower slide assembly to said lower pivot assembly and comprising a first cam pivotally attached to said lower slide assembly and cooperating with one of said lower arms and a second cam pivotally attached to said lower slide assembly and cooperating with said door and said first cam.

* * * * *